(12) United States Patent
Beard et al.

(10) Patent No.: US 12,260,634 B2
(45) Date of Patent: Mar. 25, 2025

(54) ATTITUDE ERROR OBSERVATIONS FROM IMAGE RELATIVE MOTIONS

(71) Applicant: L3Harris Technologies, Inc., Melbourne, FL (US)

(72) Inventors: Andrew Michael Beard, Healdsburg, CA (US); James Suriano, Windsor, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 260 days.

(21) Appl. No.: 18/176,820

(22) Filed: Mar. 1, 2023

(65) Prior Publication Data

US 2024/0296672 A1  Sep. 5, 2024

(51) Int. Cl.
*G06V 20/17*  (2022.01)
*G05D 1/00*  (2024.01)
*G08G 5/00*  (2006.01)

(52) U.S. Cl.
CPC .......... *G06V 20/17* (2022.01); *G05D 1/0094* (2013.01); *G05D 1/0808* (2013.01); *G05D 1/101* (2013.01); *G08G 5/003* (2013.01)

(58) Field of Classification Search
CPC .... G06V 20/17; G05D 1/0094; G05D 1/0808; G05D 1/101; G08G 5/003
USPC ......................................................... 382/103
See application file for complete search history.

(56) References Cited

U.S. PATENT DOCUMENTS

| | | | |
|---|---|---|---|
| 7,409,293 B2 * | 8/2008 | Hager ................... | G01C 21/005 342/121 |
| 8,174,568 B2 | 5/2012 | Samarasekera et al. | |
| 9,477,230 B2 * | 10/2016 | Sastre ................... | G01C 21/04 |
| 10,935,978 B2 * | 3/2021 | Yalla ..................... | G06V 20/56 |
| 10,937,232 B2 * | 3/2021 | Huang ................... | G01S 17/89 |
| 10,962,625 B2 * | 3/2021 | Aycock ................. | G01S 19/485 |
| 10,997,746 B2 | 5/2021 | He et al. | |
| 11,003,945 B2 * | 5/2021 | Adams ................... | G06V 20/56 |
| 11,015,957 B2 | 5/2021 | Wilkinson | |
| 11,029,159 B2 | 6/2021 | Henderson | |
| 11,037,018 B2 * | 6/2021 | Ellis ..................... | G01C 21/165 |
| 11,041,724 B2 | 6/2021 | Malvern et al. | |
| 11,047,683 B2 * | 6/2021 | Simon ................... | G01C 9/00 |
| 11,074,746 B2 * | 7/2021 | You ..................... | G08G 5/0086 |

(Continued)

FOREIGN PATENT DOCUMENTS

WO  WO-2020136633 A1 *  7/2020  ............... G06T 7/74

OTHER PUBLICATIONS

Sonoma 2511X™, High-Altitude, Long Standoff, EO/IR Imaging System with Enhanced Geopointing, L3HARRIS, downloaded from the internet on Feb. 28, 2023, 7 pages.

(Continued)

*Primary Examiner* — Mahendra R Patel
(74) *Attorney, Agent, or Firm* — Edell, Shapiro & Finnan, LLC

(57) ABSTRACT

In some aspects, the techniques described herein relate to a method including: determining a target in a line of sight of an imaging device mounted to an aircraft; acquiring a plurality of images from the imaging device while steering the aircraft through a trajectory about the target; determining a mapping of a fixed reference feature in the plurality of images; and determining an error in an orientation of the imaging device based upon the mapping of the fixed reference feature.

17 Claims, 7 Drawing Sheets

(56) References Cited

U.S. PATENT DOCUMENTS

| | | | |
|---|---|---|---|
| 11,094,079 B2* | 8/2021 | Hoff | G06T 7/74 |
| 11,094,137 B2* | 8/2021 | Gausebeck | G06T 19/20 |
| 11,107,244 B1 | 8/2021 | Warnaar et al. | |
| 11,755,041 B2* | 9/2023 | Zhu | H04N 5/272 |
| | | | 701/3 |
| 11,797,009 B2* | 10/2023 | Martirosyan | G05D 1/0094 |
| 11,828,598 B1* | 11/2023 | Mastrangelo | G06V 20/17 |
| 11,829,139 B2* | 11/2023 | Jobanputra | B64D 47/08 |
| 11,953,599 B2* | 4/2024 | Toledano | G01S 17/48 |
| 2010/0157056 A1* | 6/2010 | Zohar | G01S 13/66 |
| | | | 348/148 |
| 2017/0010618 A1* | 1/2017 | Shashua | G01C 21/1656 |
| 2017/0301111 A1* | 10/2017 | Zhao | H04N 23/90 |
| 2018/0082438 A1* | 3/2018 | Simon | G06T 7/74 |
| 2019/0011921 A1* | 1/2019 | Wang | G06T 7/246 |
| 2019/0147619 A1* | 5/2019 | Goldman | G06T 17/05 |
| | | | 382/154 |
| 2019/0180501 A1* | 6/2019 | You | G08G 5/0013 |
| 2019/0331762 A1* | 10/2019 | Aycock | G06T 7/70 |
| 2020/0257301 A1* | 8/2020 | Weiser | G08G 1/163 |
| 2021/0372793 A1* | 12/2021 | Nikulin | G01C 15/00 |

OTHER PUBLICATIONS

Wescam MX™-15, Air Surveillance and Reconnaissance, L3HARRIS, downloaded from the internet on Feb. 28, 2023, 19 pages.

D.R. Wong, et al., "IMU-Aided SURF Feature Matching for Relative Pose Estimation", 2010 25th International Conference of Image and Vision Computing New Zealand. IEEE, 2010, 6 pages.

ImageNav™, Scientific Systems Company, Inc., https://www.ssci.com/products/imagenav/?force_isolation=true, 2023, 3 pages.

A. Fitzgibbon, et al., "Direct Least Square Fitting of Ellipses", Pattern Analysis and Machine Intelligence, vol. 21, No. 5, May 1999, 5 pages.

* cited by examiner

ATTITUDE ERROR OBSERVATIONS FROM IMAGE RELATIVE MOTIONS

TECHNICAL FIELD

The present disclosure relates to navigational image analysis.

BACKGROUND

Remote sensing is the acquisition of information about an object or phenomenon without making physical contact with the object, in contrast to in situ or on-site observation. In general, the observations are made using sensors mounted on aircraft or satellites. Remote sensing is used in numerous fields, including geography, land surveying and most Earth science disciplines (e.g., hydrology, ecology, meteorology, oceanography, glaciology, geology); it also has military, intelligence, commercial, economic, planning, and humanitarian applications, among others.

Often in remote sensing applications an aircraft will image a target, and then attempt to determine the target position or position itself over that target based upon the image information. The ability to accurately locate a target is dependent on precisely knowing the orientation of the image sensor relative to the aircraft location (e.g., relative to the navigation frame of the aircraft or relative to the aircraft itself) and trajectory.

DETAILED DESCRIPTION

Overview

In some aspects, the techniques described herein relate to a method including: determining a target in a line of sight of an imaging device mounted to an aircraft; acquiring a plurality of images from the imaging device while steering the aircraft through a trajectory about the target; determining a mapping of a fixed reference feature in the plurality of images; and determining an error in an orientation of the imaging device based upon the mapping of the fixed reference feature.

In some aspects, the techniques described herein relate to an apparatus including: an imaging device mounted to an aircraft; and one or more processors configured to: determine a target in a line of sight of the imaging device from image data acquired from the imaging device; acquire a plurality of images from the imaging device while the aircraft is steered through a trajectory about the target; determine a mapping of a fixed reference feature in the plurality of images; and determine an error in an orientation of the imaging device based upon the mapping of the fixed reference feature.

In some aspects, the techniques described herein relate to one or more tangible non-transitory computer-readable mediums encoded with instructions, wherein the instructions, when executed by one or more processors, cause the one or more processors to: determine a target in a line of sight of an imaging device mounted to an aircraft; acquire a plurality of images from the imaging device while steering the aircraft through a trajectory about the target; determine a mapping of a fixed reference feature in the plurality of images; and determine an error in an orientation of the imaging device based upon the mapping of the fixed reference feature.

EXAMPLE EMBODIMENTS

Figure 1:
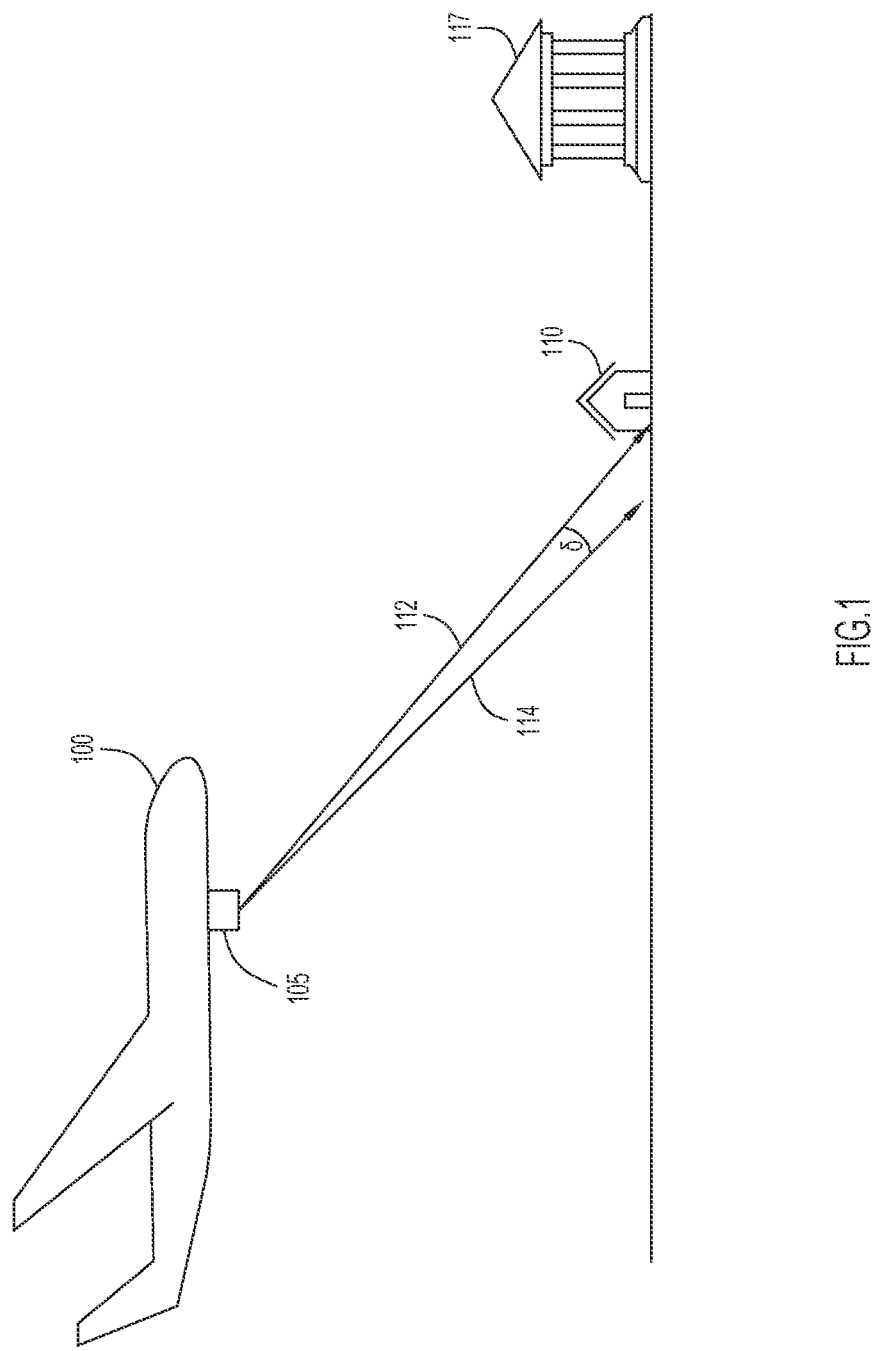
FIG. 1 is an illustration of an aircraft mounted imaging device configured to implement the attitude error observation techniques of this disclosure, according to an example embodiment.

With reference made to FIG. 1, depicted therein is an aircraft 100 with associated imaging device 105. Aircraft 100 is imaging target 110 using a presumed line of sight (LOS) 112 of imaging device 105. However, due to attitude error 8, actual LOS 114 is offset from target 110. Attitude error 8 of FIG. 1 may be indicative of an elevation or azimuth error in actual LOS 114 compared with presumed LOS 112.

Attempts to position aircraft 100 at a particular location relative to target 110 or determine the precise location of target 110 may exhibit an error introduced due to attitude error 8. Accordingly, systems attempt to correct for attitude error 8 through different techniques. For example, some related art techniques attempt to correct attitude error 8 by locating reference points with known geographic locations within the images provided by imaging device 105. Comparing such known reference points to locations determined from LOS 112 to target 110 allows for the correction of attitude error 8. For example, if the location of landmark 117 is precisely known, a location determined for landmark 117 by using imaging device 105 may be compared with the known location for landmark 117. The difference between the two locations may be used to identify attitude error 8, which may then be corrected for when performing location calculations based upon images of target 110. According to other techniques, an image acquired from imaging device 105 may be registered to an image with features in known locations. By registering the same features in the two images, the attitude error 8 in the imaging device 105 may be accounted for. However, the ability to apply such techniques is dependent upon having a source of "absolute truth" acquired from outside of the images acquired by imaging device 105. Put differently, these techniques rely on information not provided by imaging device 105, such as the known location of landmark 117.

The techniques disclosed herein allow for the determination and correction of attitude error 8 based on the content of the images acquired by the imaging device 105 in absence of image reference points whose locations are independently known. Specifically, provided for herein are techniques for observing absolute pointing-bias errors (e.g., attitude errors) through image-scene relative motion behavior. As will be explained in greater detail below, the techniques disclosed herein provide for a method in which a known trajectory of aircraft 100 relative to target 110 is compared with the path traversed by fixed reference features within images taken by imaging device 105 as aircraft 100 traverses the trajectory. By comparing the known trajectory to the path taken by the fixed reference features in the acquired images, attitude error 8 may be determined and subsequently corrected for. These fixed features may be used to determine the attitude error 8 so long as their location relative to target 110 remains fixed, regardless of whether the precise locations of the fixed features are known and regardless of whether the distances from the fixed reference features to the target are known.

Figure 2:
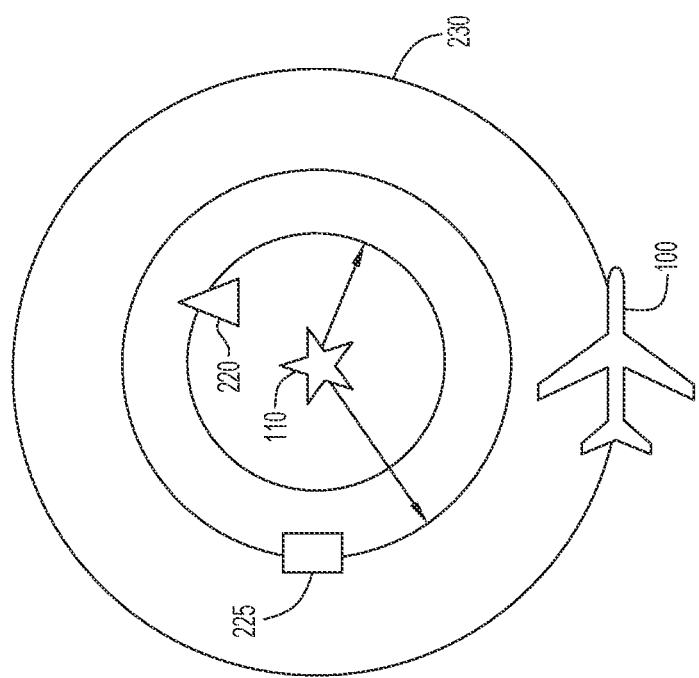
FIG. 2 illustrates an aircraft trajectory implemented as part of the attitude error observation techniques of this disclosure, according to an example embodiment.

With reference now made to FIG. 2, depicted therein is an overhead view of aircraft 100, target 110 and two fixed reference features 220 and 225. According to the techniques disclosed herein, aircraft 100 follows a trajectory about target 110, which in this example is circular trajectory 230. Trajectory 230 is determined based upon the imagery provide by imaging device 105 (illustrated in FIG. 1) and navigational data, such as Global Position System (GPS) data, known to aircraft 100. As aircraft 100 traverses trajectory 230, imaging device 105 takes a series of images that include target 110 and fixed reference features 220 and 225. Due to the motion of aircraft 100 through trajectory 230, fixed reference features 220 and 225 will mark out paths in the images acquired by aircraft 100. As will be described in detail below, if the path of trajectory 230 is known, features of the path traversed by one or more of fixed reference features 220 and 225 in the acquired images may be used to determine the attitude error 8 in the orientation of the sensor used to acquire the images.

Due to the circular shape of trajectory 230, fixed reference features 220 and 225 will appear to rotate about target 110 in the images acquired by imaging device 105. However, due to the perspective of imaging device 105, the path traversed by fixed reference features 220 and 225 in the actual images undergoes a perspective transform, resulting in the elliptical paths 330a/b and 335a/b illustrated in FIG. 3. This perspective transform may be understood by considering the extreme case of a helicopter rotating about target 110. The images acquired by a helicopter rotating above target 110 would show fixed reference features 220 and 220 rotating about target 110 in a circular path. The images acquired by an aircraft circling target 110 will show fixed reference features 220 and 225 rotating about target 110 in an elliptical path whose eccentricity changes with the radius of the aircraft's orbit.

Figure 3:
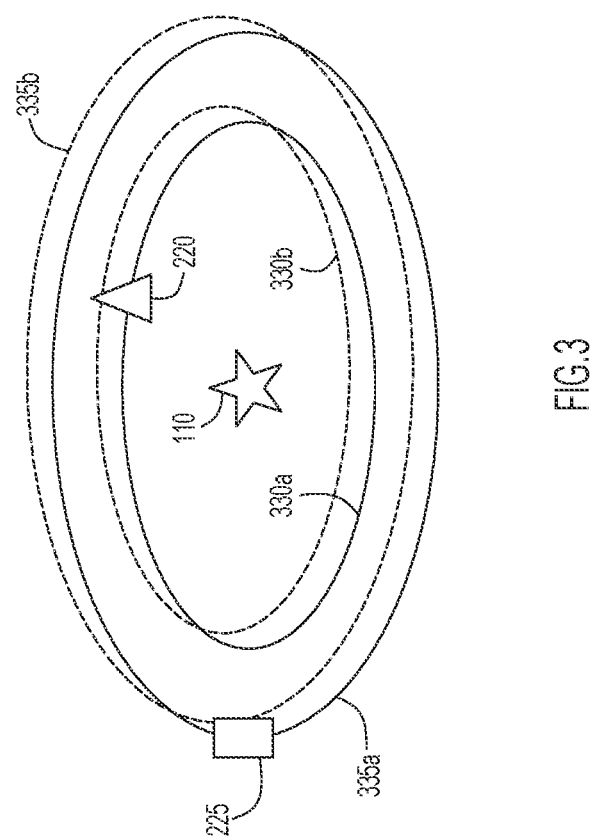
FIG. 3 illustrates perspective transformations in images acquired by the aircraft while traversing the trajectory of FIG. 2 as part of the attitude error observation techniques of this disclosure, according to an example embodiment.

As shown in FIG. 3, if there are no attitude errors in the orientation of imaging device 105, elliptical paths 330a and 335a for fixed reference features 220 and 225, respectively, will be centered on target 110. On the other hand, if attitude errors are present in the orientation of imaging device 105, the paths taken by fixed reference features 220 and 225 will share a common center, but this center will be offset from target 110, as illustrated through paths 330b and 335b. The offset of the center of either of ellipse 330b or 335b from target 110 may be encoded with information from which the attitude error in the sensor may be determined. Accordingly, by determining paths 330a/b and/or 335a/b, and determining a center offset from target 110, if present, attitude errors in the orientation of the imaging device may be identified and corrected for.

The elliptical paths traced out by fixed reference features 220 and 225 may have common features, including a common center and a common ratio of their major axes. These common features may be leveraged by the disclosed techniques to more accurately or efficiently determine attitude errors in the orientation of an imaging device of aircraft 100. For example, a best fit approach may be applied to paths 330b and 335b to determine their common center. The offset of this common center from target 110 may then be used to determine the attitude error in the sensor of aircraft 100.

Figure 4:
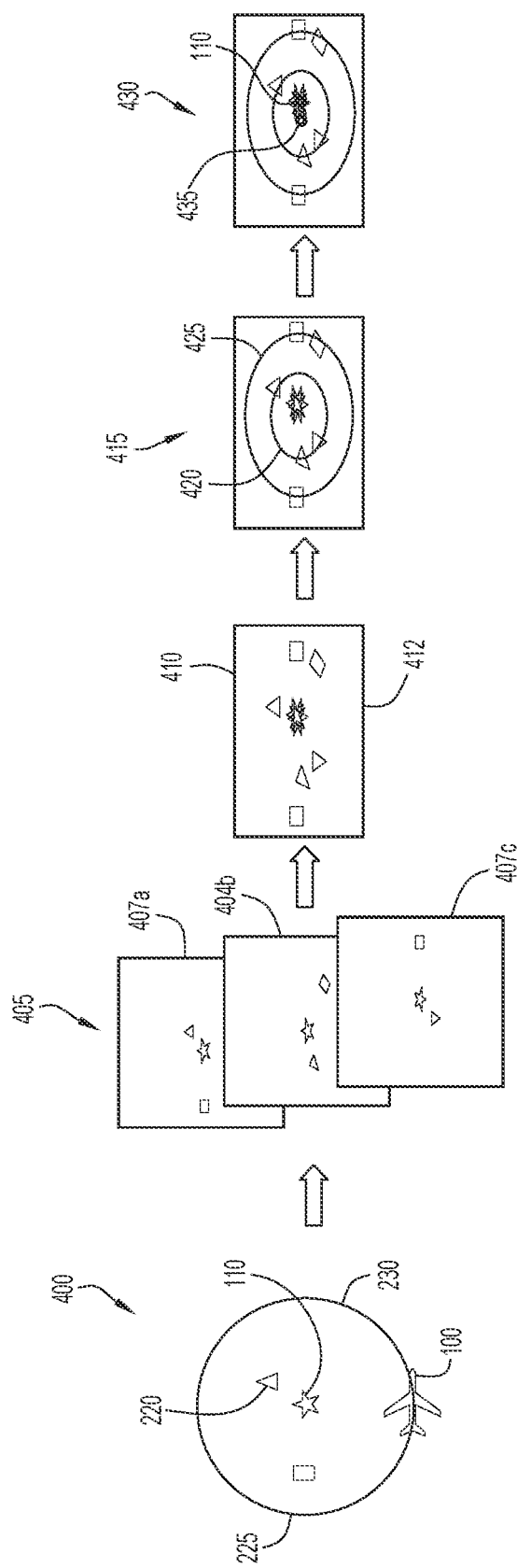
FIG. 4 is a process flow for implementing the attitude error observation techniques of this disclosure, according to an example embodiment.

Turning to FIG. 4, depicted therein is a process flow for implementing the techniques of this disclosure. The process flow begins in operation 400 in which aircraft 100 traverses a trajectory 230 about target 110. According to this example, trajectory 230 is a circular path centered on target 110, which is arranged along the LOS of the imaging device. A circular trajectory has been chosen as it may simplify the calculations discussed below. However, other trajectories may be used, such as elliptical and other closed trajectories, as well as arbitrary and open trajectories. Specifically, the techniques disclosed herein may be applied, in principle, to trajectories other than the circular trajectories described in this example embodiment. The transformation mapping from world coordinates to image coordinates described herein depends on factors such as sensor-target relative position, sensor attitude and camera parameters. Generally, the sensitivity in this mapping to attitude errors is not constant, but geometry dependent. The target centered circular trajectory described herein presents a simplified case for purposes of this disclosure as the error sensitivities are constant, and therefore, the ellipse center determination described below determines the attitude error of the sensor. The skilled artisan understands that geometry dependent sensitivities may be modeled and observed feature tracks may be monitored to best fit attitude errors for other trajectories.

Furthermore, while this example refers to target 110 for sake of simplicity, target 110 may not be an item of interest to the operator of aircraft 100, and may instead refer simply to a point to which the line of sight of the imaging device of aircraft 100 is directed (i.e., a point in the center of the image acquired by the imaging device).

Next, in operation 405, a series of images 407a-c are acquired by the imaging device of aircraft 100 as it traverses trajectory 230. While FIG. 4 illustrates three images 407a-c, the actual number of images taken and used in the disclosed techniques may deviate significantly from this number. The images 407a-c acquired in operation 405 include images of fixed reference features 220 and 225. As used herein, a fixed reference feature refers to a feature that is fixed relative to the earth, such as a road or a corner of a building. Due to the elevation of aircraft 100 and its lateral offset from target 110, images 407a-c have undergone a perspective transformation.

In operation 410, the relative motion of one or more of the fixed reference features 220 and 225 in the images is analyzed, conceptually illustrated through the overlay 412 of the images 407a-c. Based upon the motion of fixed reference features 220 and 225 in the images 407a-c, a flow path may be determined for one or more of the fixed reference features 220 and 225, and it is from these flow paths that attitude errors in the orientation of the imaging device may be determined. Specifically, because trajectory 230 of FIG. 4 is circular, the flow paths for fixed reference features 220 and 225 will be elliptical. The perspective of the imaging device (i.e., its elevation and offset from target 110) determines the major and minor axes for the ellipses traced out by fixed reference features 220 and 225 in images 407*a-c*. Accordingly, operation 415 illustrates the determination of the flow paths 420 and 425 for fixed reference features 220 and 225, respectively. The offset of the center 435 of either of elliptical paths 420 and 425 from target 110 may be used to determine the attitude error in the sensor of aircraft 100.

According to specific examples, flow paths 420 and 425 are determined using a least squares method where the possible ellipses are constrained such that they share a common major axis to minor axis ratio, share a common center, and fit canonical to general-form coefficients for ellipses. Based upon these constraints, the ellipses for the fixed reference feature flow paths 420 and 425 are determined.

For example, the generalized conic section equation is as follows:

$$Ax^2 + Bxy + Cy^2 + Dx + Ey + F = 0, \quad (1)$$

with the generalized equation for an ellipse taking the form of:

$$\frac{(x-h)^2}{a^2} + \frac{(y-k)^2}{b^2} = 1. \quad (2)$$

Expanding the ellipse equation to the generalized conic section equation provides the following:

$$x^2 + \left(\frac{a}{b}\right)^2 y^2 - 2hx - 2\left(\frac{a}{b}\right)^2 ky + h^2 - a^2 + \left(\frac{a}{b}\right)^2 k^2 = 0; \quad (3)$$

with the conic section equation coefficients being defined as follows:

$$A = 1,\ B = 0,\ C = \left(\frac{a}{b}\right)^2,\ D = -2h,\ E = -2\left(\frac{a}{b}\right)^2 k,\ F = h^2 - a^2 + k^2\left(\frac{a}{b}\right)^2. \quad (4)$$

A matrix for of an ellipse takes the following form for a single feature track across n frame samples (i.e., n images):

$$\begin{bmatrix} x_1^2 & y_1^2 & x_1 & y_1 & 1 \\ x_2^2 & y_2^2 & x_2 & y_2 & 1 \\ x_n^2 & y_n^2 & x_n & y_n & 1 \end{bmatrix} \begin{bmatrix} A \\ C \\ D \\ E \\ F \end{bmatrix} = 0, \quad (5)$$

when the major and minor axes are aligned with the x-y reference frame, and the coefficient B has a value of zero.

Given that A equals 1, equation 5 may be rewritten as follows:

$$\begin{bmatrix} y_1^2 & x_1 & y_1 & 1 \\ y_2^2 & x_2 & y_2 & 1 \\ y_n^2 & x_n & y_n & 1 \end{bmatrix} \begin{bmatrix} C \\ D \\ E \\ F \end{bmatrix} = -\begin{bmatrix} x_1^2 \\ x_2^2 \\ x_3^2 \\ x_4^2 \end{bmatrix}. \quad (6)$$

Using the following substitutions:

$$J = \begin{bmatrix} y_1^2 & x_1 & y_1 & 1 \\ y_2^2 & x_2 & y_2 & 1 \\ y_n^2 & x_n & y_n & 1 \end{bmatrix};$$

$$V = \begin{bmatrix} C \\ D \\ E \\ F \end{bmatrix}; \text{ and}$$

$$Q = -\begin{bmatrix} x_1^2 \\ x_2^2 \\ x_3^2 \\ x_4^2 \end{bmatrix},$$

equation (6) may be rewritten as follows:

$$JV = Q. \quad (7)$$

Conical form coefficients of ellipses V may be solved for as follows:

$$J^T J V = J^T Q; \quad (8)$$

$$V = [J^T J]^{-1} J^T Q. \quad (9)$$

Once solved for, a least squares fit of the feature trajectory across n-frames of the images may be used to determine values for V. Additional features from the frames may add rows to J and Q. Ellipse parameters, parameters C, D and E, may be common across the features in the image frames, while F may be feature distinct. Ellipse center (h,k) may be derived from the elements of V, exploiting model relationships of equation (4).

Once the elliptical flow paths 420 and 425 are determined such that they share a common center, this common center is compared to the LOS target 110, as illustrated in operation 430. Common center 435 is offset from the location of LOS target 110. The direction and magnitude of this offset encodes the attitude errors in the orientation of the imaging device, such as attitude error 8 in FIG. 1.

Figure 5:
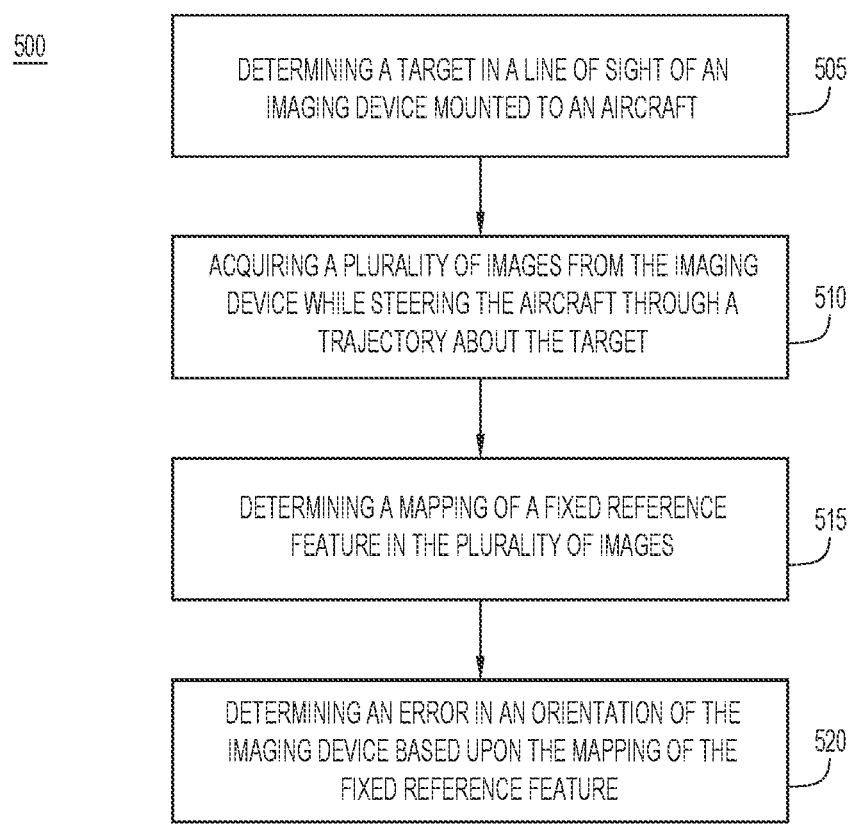
FIG. 5 is a flowchart illustrating a generalized process flow for implementing the attitude error observation techniques of this disclosure, according to an example embodiment.

With reference now made to FIG. 5, depicted therein is a flowchart 500 illustrating a generalized process flow for implementing the techniques disclosed herein. As noted above, the generalized process flow may be implemented using an arbitrary trajectory, including open trajectories, while tracking a single fixed feature in the images acquired while traversing the trajectory. When implementing the disclosed techniques using such trajectories, the sensitivity to error would be predicted based on a dynamic model and the feature tracks observed. Using the model sensitivity and observed track, the corresponding pointing biases may be estimated. A more specific process flow utilizing a circular trajectory and two or more fixed features is described below with reference to flowchart 600 of FIG. 6.

Flowchart 500 begins in operation 505 in which a line of sight from an imaging device to a target is determined. According to the example of FIG. 5, the imaging device is mounted to an aircraft. Accordingly, operation 505 may be embodied as the pointing of imaging device 105 of FIG. 1 at a target or another reference point in the line of sight of the imaging device. The target point of operation 505 may be an item of interest for an operator of the aircraft or it may be a reference point that has no significance beyond its use in determining attitude errors in the orientation of the imaging device.

Next, in operation 510, a plurality of images are acquired by the imaging device while the aircraft is steered through a trajectory about the target. As discussed above, the trajectory may be an arbitrary trajectory. Furthermore, the trajectory of operation 510 is not limited to closed trajectories, such as the circular trajectory illustrated in FIGS. 2-4.

In operation 515, a mapping of a fixed feature in the plurality of images is determined. Finally, in operation 520, an error in the orientation of the imaging device is determined based upon the mapping of the fixed reference feature. This generalized process flow may be adapted to specific trajectories that may provide for simplified or more efficient determination of sensor orientation errors. Therefore, the process flow for implementing the disclosed techniques for a circular trajectory will now be described with reference to FIG. 6.

Figure 6:
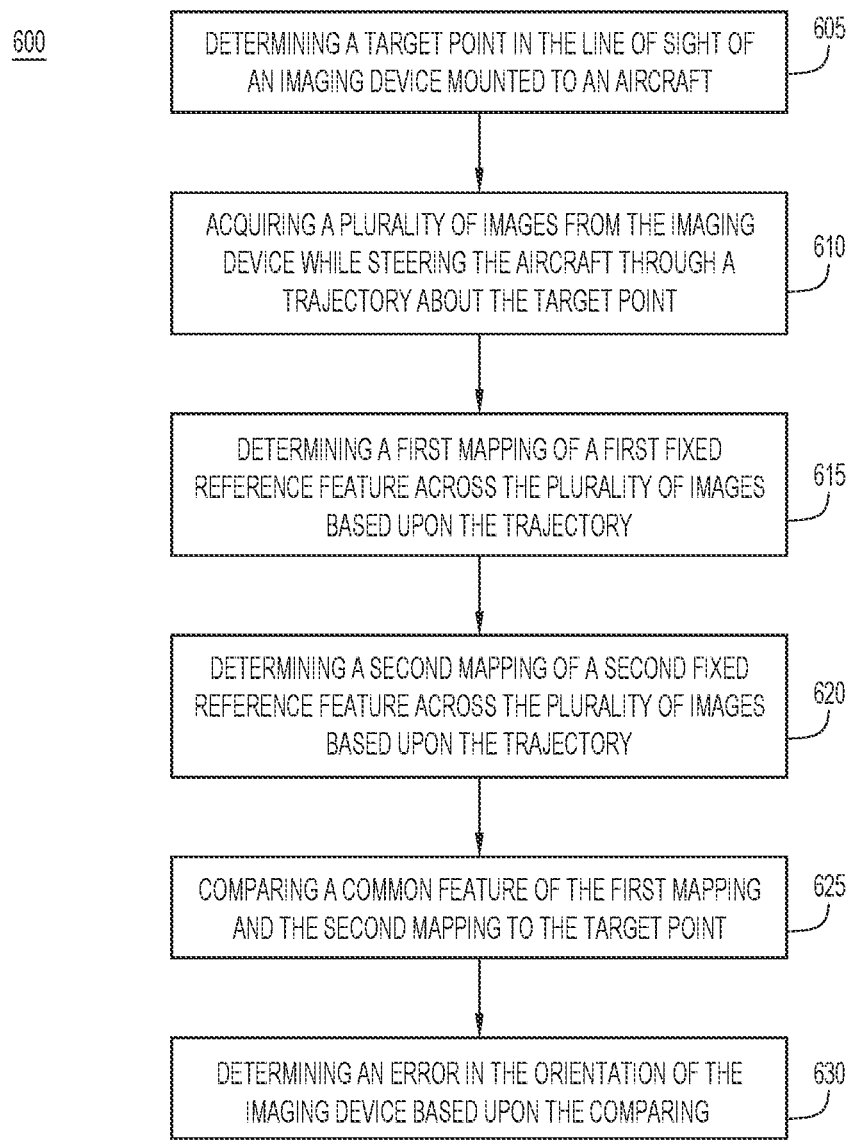
FIG. 6 is a flowchart illustrating a process flow for implementing the attitude error observation techniques of this disclosure in conjunction with a circular trajectory, according to an example embodiment.

Depicted in FIG. 6 is a flowchart 600 illustrating a process flow for implementing the techniques disclosed herein by mapping two more fixed reference points in the images acquired as an aircraft traverses a known trajectory. Similar to flowchart 500 of FIG. 5, flowchart 600 begins in operation 605 in which a target point is determined. The target point is in the line of sight of an imaging device mounted to an aircraft. Accordingly, operation 605 may be embodied as the pointing of imaging device 105 of FIG. 1 at a target or another reference point in the line of sight of the imaging device. As discussed above with reference to FIG. 5, the target point of operation 605 may be an item of interest for an operator of the aircraft or it may be a reference point that has no significance beyond its use in determining attitude errors in the orientation of the imaging device.

Next, in operation 610, a plurality of images are acquired from the imaging device while steering the aircraft through a trajectory about the target point. For example, operation 610 may be embodied by acquiring images 407a-c of FIG. 4 while steering aircraft 100 through trajectory 230. As discussed above, trajectory 230 is circular. In the case of circular trajectories and elliptical mappings of fixed features, many observations and equations enable a best fit (e.g., a least-squares fit) estimation.

In operation 615, a first mapping of a first fixed reference feature in the plurality of images is determined based upon the trajectory, and in operation 620, a second mapping of a second fixed reference features is determined based upon the trajectory. For example, if the trajectory of operation 610 is a circular trajectory, a first elliptical mapping of a first fixed reference feature is determined in operation 615, and a second elliptical mapping of a second fixed reference feature is determined in operation 620. Accordingly, operations 615 and 620 may be embodied by the determination of the elliptical flow paths 420 or 425 of FIG. 4.

Next, in operation 625, a comparison is made between a common feature of the first mapping and the second mapping to the target point. For example, as discussed above with reference to FIG. 4, the common center of elliptical flow paths 420 and 425 is compared to the location of target 110. As noted above, the location of target 110 may be considered an indication of the orientation of the imaging device because it is arranged along the LOS of the imaging device.

Finally, in operation 630, an error in the orientation of the imaging device is determined based upon the comparing of operation 625. Returning to the example of FIG. 4, operation 630 may be embodied as the comparison of the common center 435 of elliptical flow paths 420 and 425 to the location of target 110. As noted above, an offset between these two points will be encoded with the attitude error in the orientation of the imaging device. Once the attitude error is determined in operation 630, additional operations may be undertaken to leverage this knowledge. For example, the orientation of the imaging sensor may be corrected, either through hardware or software, to account for the attitude error. A hardware solution would be to manually or automatically reposition the imaging sensor such that its orientation is changed to eliminate the attitude error. Software solutions may include image processing techniques that correct for the attitude error in images produced by the imaging device.

Figure 7:
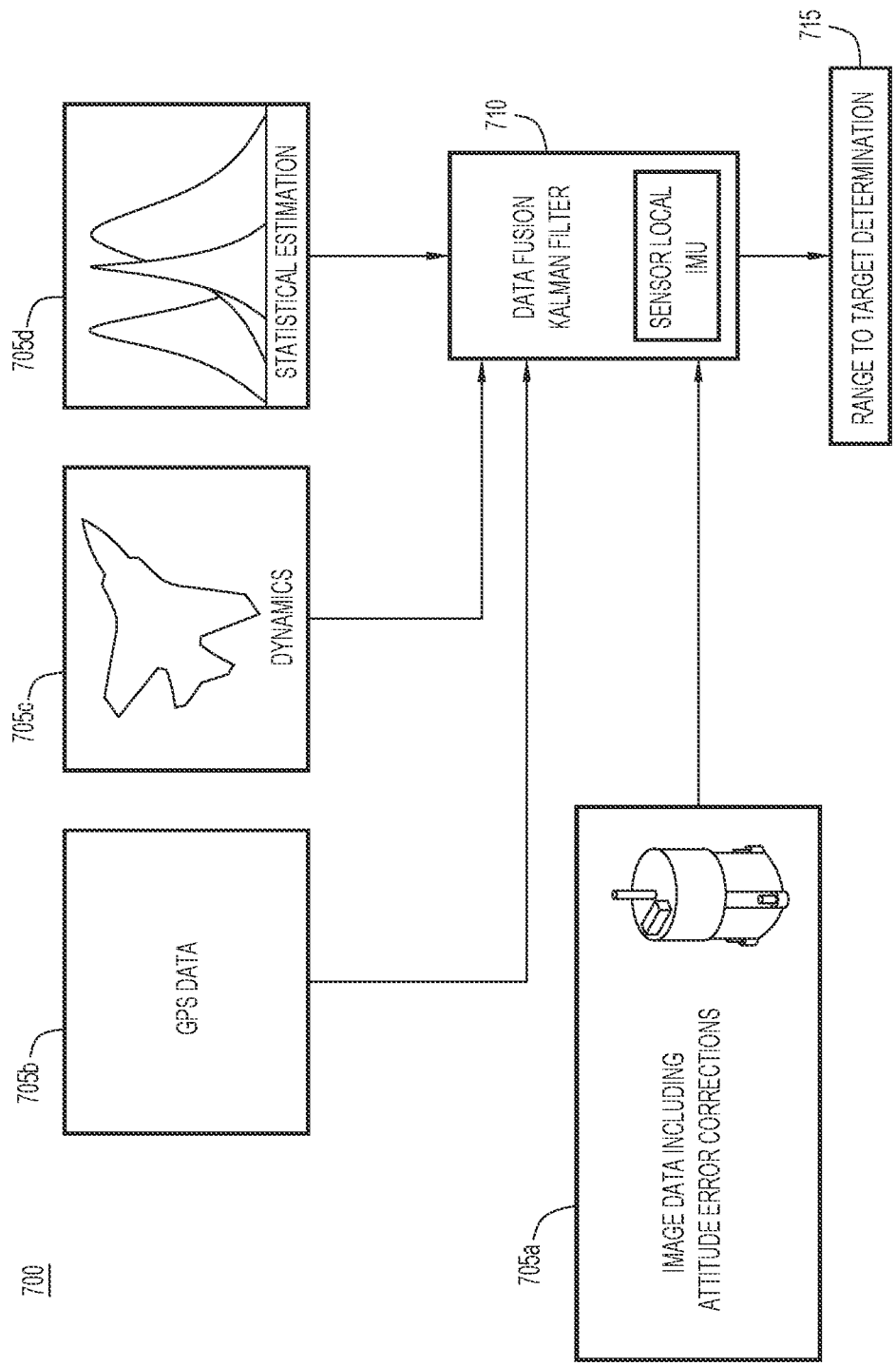
FIG. 7 illustrates a system in which the attitude error observation techniques of this disclosure may be applied in order to make range to target determinations, according to an example embodiment.

Some systems may include image sensor data in making navigation state estimates for an aircraft, such as aircraft 100 of FIGS. 1 and 5. Accordingly, the attitude correction techniques of this disclosure may be combined with other data to make range to target determinations, as illustrated in system 700 of FIG. 7. System 700 includes a number of data sources 705a-d, each of which provides data to a data fusion estimator system, in this case Kalmann filter 710. Kalmann filter 710 evaluates the different data sources and makes a combined range to target determination 715. More specifically, Kalmann filter 710 receives image data 705a including attitude error corrections determined according to the techniques disclosed herein, GPS data 705b, dynamic data 705c which includes data about the operation of the aircraft, and other statistical data 705d. Kalmann filter 710 then fuses this data and makes range to target determinations 715.

Figure 8:
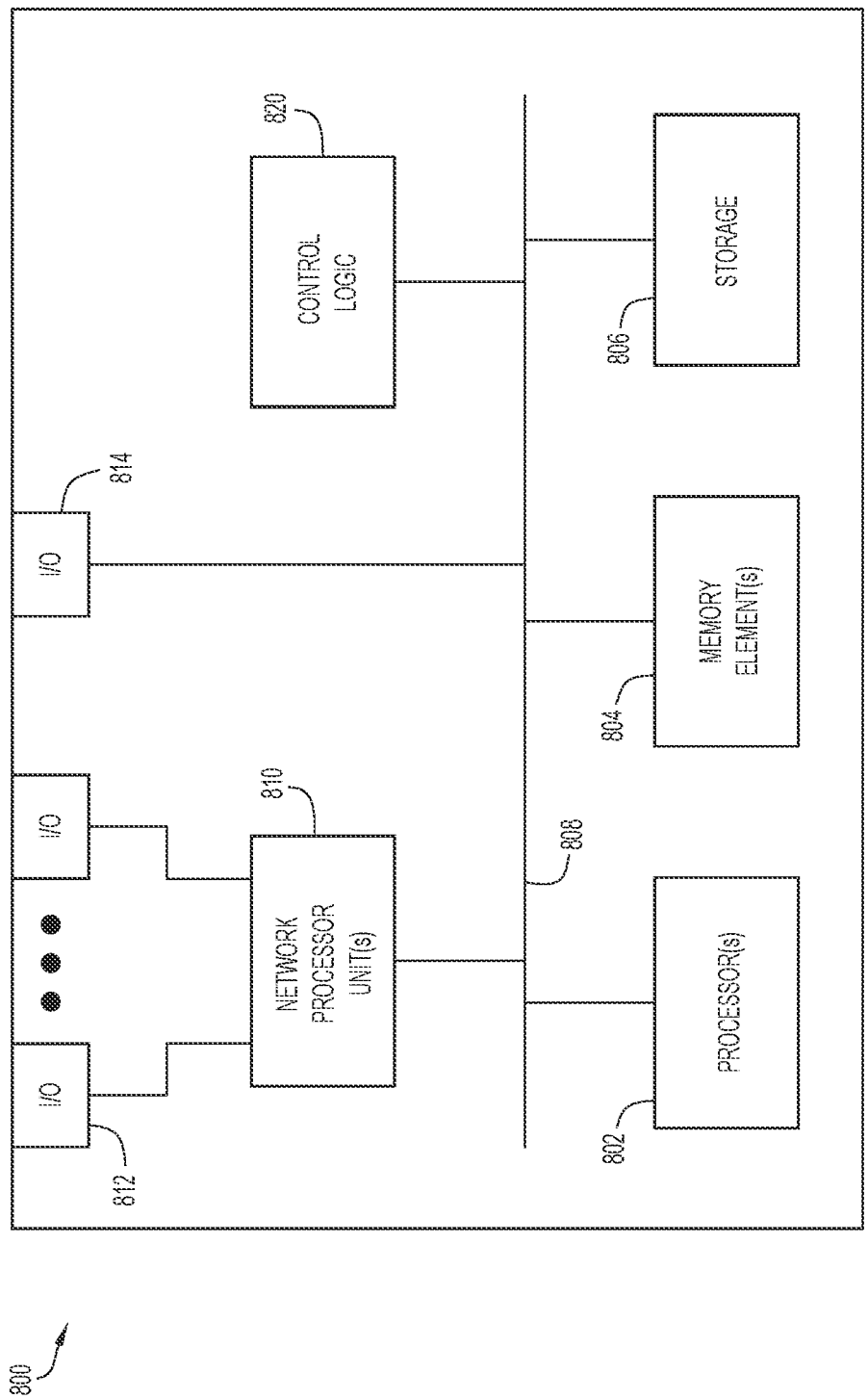
FIG. 8 provides a functional block diagram of a processing device configured to implement the attitude error observation techniques of this disclosure, according to an example embodiment.

Referring to FIG. 8, FIG. 8 illustrates a hardware block diagram of a computing device 800 that may perform functions associated with operations discussed herein in connection with the techniques depicted in FIGS. 1-6. In various embodiments, a computing device or apparatus, such as computing device 800 or any combination of computing devices 800, may be configured as any entity/entities as discussed for the techniques depicted in connection with FIGS. 1-6 in order to perform operations of the various techniques discussed herein.

In at least one embodiment, the computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, provided for herein are techniques that may leverage two-dimensional imagery, without any feature geodetic location or terrain truth reference, to observe line-of-sight pointing and navigation attitude errors. Observed attitude bias errors may be used to complement conventional aided inertial navigation in a data-fusion estimator. The disclosed techniques enable absolute attitude bias-error observation without geodetic scene reference or traditional attitude aids, such as celestial observations. The disclosed techniques also provide a complementary means to augment conventional GPS-aided navigation making use of existing airborne-intelligence-surveillance-reconnaissance (ISR) imaging infrastructure through the use of collocated inertial measurement units (IMU) and imaging sensors and that are not reliant on truth-database information. The disclosed techniques also provide for improved geo-location and geo-pointing absolute accuracy for a number of applications that include airborne target-centered trajectory applications and applications in conditions where navigation or IMU-imager misalignment attitude bias has circular error (CE) accuracy consequences. Furthermore, the techniques are not limited to bounding solution drift.

Accordingly, in some aspects, the techniques described herein relate to a method including: determining a target in a line of sight of an imaging device mounted to an aircraft; acquiring a plurality of images from the imaging device while steering the aircraft through a trajectory about the target; determining a mapping of a fixed reference feature in the plurality of images; and determining an error in an orientation of the imaging device based upon the mapping of the fixed reference feature.

In some aspects, the techniques described herein relate to a method, wherein the trajectory includes a circular trajectory about the target.

In some aspects, the techniques described herein relate to a method, wherein determining the mapping of the fixed reference feature in the plurality of images includes determining a first mapping of a first fixed reference feature in the plurality of images and determining a second mapping of a second fixed reference feature in the plurality of images; and wherein determining the error in the orientation of the imaging device includes comparing a common feature of the first mapping and the second mapping to the target.

In some aspects, the techniques described herein relate to a method: wherein determining the first mapping includes mapping a first elliptical path of the first fixed reference feature through the plurality of images; and wherein determining the second mapping includes mapping a second elliptical path of the second fixed reference feature through the plurality of images.

In some aspects, the techniques described herein relate to a method: wherein comparing the common feature of the first mapping and the second mapping to the target includes determining a best fit common center for the first elliptical path and the second elliptical path; and wherein determining the error in the orientation of the imaging device includes comparing the best fit common center to the target.

In some aspects, the techniques described herein relate to a method, wherein determining the error in the orientation of the imaging device includes determining an attitude error.

In some aspects, the techniques described herein relate to a method, wherein steering the aircraft through the trajectory about the target includes steering the aircraft based upon Global Position System data.

In some aspects, the techniques described herein relate to a method, wherein determining the error in the orientation of the imaging device includes determining the error in orientation without relying on predetermined knowledge of a location of the fixed reference feature.

In some aspects, the techniques described herein relate to a method, further including providing the error in the orientation of the imaging device to a data-fusion estimator.

In some aspects, the techniques described herein relate to an apparatus including: an imaging device mounted to an aircraft; and one or more processors configured to: determine a target in a line of sight of the imaging device from image data acquired from the imaging device; acquire a plurality of images from the imaging device while the aircraft is steered through a trajectory about the target; determine a mapping of a fixed reference feature in the plurality of images; and determine an error in an orientation of the imaging device based upon the mapping of the fixed reference feature.

In some aspects, the techniques described herein relate to an apparatus, wherein the trajectory includes a circular trajectory about the target.

In some aspects, the techniques described herein relate to an apparatus, wherein the one or more processors are configured to determine the mapping of the fixed reference feature in the plurality of images by determining a first mapping of a first fixed reference feature in the plurality of images and determine a second mapping of a second fixed reference feature in the plurality of images; and wherein the one or more processors are configured to determine the error in the orientation of the imaging device by comparing a common feature of the first mapping and the second mapping to the target.

In some aspects, the techniques described herein relate to an apparatus: wherein the one or more processors are configured to determine the first mapping by mapping a first elliptical path of the first fixed reference feature through the plurality of images; and wherein the one or more processors are configured to determine the second mapping by mapping a second elliptical path of the second fixed reference feature through the plurality of images.

In some aspects, the techniques described herein relate to an apparatus: wherein the one or more processors are configured to compare the common feature of the first mapping and the second mapping to the target by determining a best fit common center for the first elliptical path and the second elliptical path; and wherein the one or more processors are configured to determine the error in the orientation of the imaging device by comparing the best fit common center to the target.

In some aspects, the techniques described herein relate to an apparatus, wherein the one or more processors are configured to determine the error in the orientation of the imaging device by determining an attitude error.

In some aspects, the techniques described herein relate to one or more tangible non-transitory computer-readable mediums encoded with instructions, wherein the instructions, when executed by one or more processors, cause the one or more processors to: determine a target in a line of sight of an imaging device mounted to an aircraft; acquire a plurality of images from the imaging device while steering the aircraft through a trajectory about the target; determine a mapping of a fixed reference feature in the plurality of images; and determine an error in an orientation of the imaging device based upon the mapping of the fixed reference feature.

In some aspects, the techniques described herein relate to one or more tangible non-transitory computer-readable mediums, wherein the trajectory includes a circular trajectory about the target.

In some aspects, the techniques described herein relate to one or more tangible non-transitory computer-readable mediums: wherein the instructions that cause the one or more processors to determine the mapping of the fixed reference feature in the plurality of images include instructions operable to determine a first mapping of a first fixed reference feature in the plurality of images and determine a second mapping of a second fixed reference feature in the plurality of images; and wherein the instructions that cause the one or more processors to determine the error in the orientation of the imaging device include instructions operable to compare a common feature of the first mapping and the second mapping to the target.

In some aspects, the techniques described herein relate to one or more tangible non-transitory computer-readable mediums: wherein the instructions that cause the one or more processors to determine the first mapping include instructions that cause the one or more processors to map a first elliptical path of the first fixed reference feature through the plurality of images; and wherein the instructions that cause the one or more processors to determine the second mapping include instructions that cause the one or more processors to map a second elliptical path of the second fixed reference feature through the plurality of images.

In some aspects, the techniques described herein relate to one or more tangible non-transitory computer-readable mediums: wherein the instructions that cause the one or more processors to compare the common feature of the first mapping and the second mapping to the target include instructions that cause the one or more processors to determine a best fit common center for the first elliptical path and the second elliptical path; and wherein the instructions that cause the one or more processors to determine the error in the orientation of the imaging device include instructions that cause the one or more processors to compare the best fit common center to the target.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 7) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   determining a target in a line of sight of an imaging device mounted to an aircraft;
   acquiring a plurality of images from the imaging device while steering the aircraft through a trajectory about the target;
   determining a first mapping of a first fixed reference feature in the plurality of images;
   determining a second mapping of a second fixed reference feature in the plurality of images; and
   determining an error in an orientation of the imaging device by comparing a common feature of the first mapping and the second mapping to the target.

2. The method of claim 1, wherein the trajectory comprises a circular trajectory about the target.

3. The method of claim 1:
wherein determining the first mapping comprises mapping a first elliptical path of the first fixed reference feature through the plurality of images; and
wherein determining the second mapping comprises mapping a second elliptical path of the second fixed reference feature through the plurality of images.

4. The method of claim 3:
wherein comparing the common feature of the first mapping and the second mapping to the target comprises determining a best fit common center for the first elliptical path and the second elliptical path; and
wherein determining the error in the orientation of the imaging device comprises comparing the best fit common center to the target.

5. The method of claim 1, wherein determining the error in the orientation of the imaging device comprises determining an attitude error.

6. The method of claim 1, wherein steering the aircraft through the trajectory about the target comprises steering the aircraft based upon Global Position System data.

7. The method of claim 1, wherein determining the error in the orientation of the imaging device comprises determining the error in orientation without relying on predetermined knowledge of a location of the first fixed reference feature.

8. The method of claim 1, further comprising providing the error in the orientation of the imaging device to a data-fusion estimator.

9. An apparatus comprising:
an imaging device mounted to an aircraft; and
one or more processors configured to:
determine a target in a line of sight of the imaging device from image data acquired from the imaging device;
acquire a plurality of images from the imaging device while the aircraft is steered through a trajectory about the target;
determine a first mapping of a first fixed reference feature in the plurality of images;
determine a second mapping of a second fixed reference feature in the plurality of images; and
determine an error in an orientation of the imaging device by comparing a common feature of the first mapping and the second mapping to the target.

10. The apparatus of claim 9, wherein the trajectory comprises a circular trajectory about the target.

11. The apparatus of claim 9:
wherein the one or more processors are configured to determine the first mapping by mapping a first elliptical path of the first fixed reference feature through the plurality of images; and
wherein the one or more processors are configured to determine the second mapping by mapping a second elliptical path of the second fixed reference feature through the plurality of images.

12. The apparatus of claim 11:
wherein the one or more processors are configured to compare the common feature of the first mapping and the second mapping to the target by determining a best fit common center for the first elliptical path and the second elliptical path; and
wherein the one or more processors are configured to determine the error in the orientation of the imaging device by comparing the best fit common center to the target.

13. The apparatus of claim 9, wherein the one or more processors are configured to determine the error in the orientation of the imaging device by determining an attitude error.

14. One or more tangible non-transitory computer-readable mediums encoded with instructions, wherein the instructions, when executed by one or more processors, cause the one or more processors to:
determine a target in a line of sight of an imaging device mounted to an aircraft;
acquire a plurality of images from the imaging device while steering the aircraft through a trajectory about the target;
determine a first mapping of a first fixed reference feature in the plurality of images;
determine a second mapping of a second fixed reference feature in the plurality of images; and
determine an error in an orientation of the imaging device by comparing a common feature of the first mapping and the second mapping to the target.

15. The one or more tangible non-transitory computer-readable mediums of claim 14, wherein the trajectory comprises a circular trajectory about the target.

16. The one or more tangible non-transitory computer-readable mediums of claim 14:
wherein the instructions that cause the one or more processors to determine the first mapping comprise instructions that cause the one or more processors to map a first elliptical path of the first fixed reference feature through the plurality of images; and
wherein the instructions that cause the one or more processors to determine the second mapping comprise instructions that cause the one or more processors to map a second elliptical path of the second fixed reference feature through the plurality of images.

17. The one or more tangible non-transitory computer-readable mediums of claim 16:
wherein the instructions that cause the one or more processors to compare the common feature of the first mapping and the second mapping to the target comprise instructions that cause the one or more processors to determine a best fit common center for the first elliptical path and the second elliptical path; and
wherein the instructions that cause the one or more processors to determine the error in the orientation of the imaging device comprise instructions that cause the one or more processors to compare the best fit common center to the target.

* * * * *